(12) United States Patent
Powers et al.

(10) Patent No.: US 9,616,897 B2
(45) Date of Patent: *Apr. 11, 2017

(54) SYSTEMS AND METHODS FOR PREDICTING WEATHER PERFORMANCE FOR A VEHICLE

(71) Applicant: Fathym, Inc., Boulder, CO (US)

(72) Inventors: Richard M. Powers, Lakewood, CO (US); John C. Mickey, Boulder, CO (US); E. Duer Reeves, Boulder, CO (US)

(73) Assignee: Fathym, Inc., Boulder, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/882,642

(22) Filed: Oct. 14, 2015

(65) Prior Publication Data
US 2016/0137208 A1 May 19, 2016

Related U.S. Application Data

(63) Continuation of application No. 14/516,309, filed on Oct. 16, 2014, now Pat. No. 9,187,099.

(60) Provisional application No. 61/892,166, filed on Oct. 17, 2013.

(51) Int. Cl.
*B60W 40/06* (2012.01)
*B60W 30/00* (2006.01)
*B60W 40/068* (2012.01)

(52) U.S. Cl.
CPC ............ *B60W 40/06* (2013.01); *B60W 30/00* (2013.01); *B60W 40/068* (2013.01); *B60W 2520/26* (2013.01); *B60W 2550/402* (2013.01); *B60W 2550/404* (2013.01); *B60W 2710/30* (2013.01)

(58) Field of Classification Search
CPC .......................... B60W 40/104; B60W 40/101
See application file for complete search history.

(56) References Cited

U.S. PATENT DOCUMENTS

| | | | |
|---|---|---|---|
| 6,272,411 B1 | 8/2001 | Corrado et al. | |
| 6,459,083 B1 * | 10/2002 | Finkele | B60Q 9/008 250/339.1 |
| 6,720,920 B2 | 4/2004 | Breed et al. | |
| 7,164,117 B2 | 1/2007 | Breed et al. | |
| 7,164,365 B2 | 1/2007 | Doherty et al. | |
| 7,224,453 B2 * | 5/2007 | Elman | G01N 21/359 356/326 |
| 7,283,904 B2 | 10/2007 | Benjamin et al. | |
| 7,295,925 B2 | 11/2007 | Breed et al. | |
| 7,355,509 B2 | 4/2008 | Rennie et al. | |

(Continued)

FOREIGN PATENT DOCUMENTS

| | | | |
|---|---|---|---|
| JP | 2009-123153 A | 6/2009 | |
| JP | 2010-020430 A | 1/2010 | |

(Continued)

*Primary Examiner* — Thomas Tarcza
*Assistant Examiner* — Alex C Dunn
(74) *Attorney, Agent, or Firm* — Russell T. Manning; Marsh Fischmann & Breyfogle LLP

(57) ABSTRACT

Systems and methods for obtaining data about road conditions as they pertain to an individual vehicle, using this information to build a model of vehicle behavior as a function of its environment, and aggregating information concerning multiple vehicles along with data from other sources in order to predict vehicle behavior in future environments.

16 Claims, 17 Drawing Sheets

(56) References Cited

U.S. PATENT DOCUMENTS

| | | | |
|---|---|---|---|
| 7,454,442 B2 | 11/2008 | Cobleigh et al. | |
| 7,714,705 B2 | 5/2010 | Rennie et al. | |
| 7,825,824 B2 | 11/2010 | Shrum, Jr. | |
| 8,120,473 B2 | 2/2012 | Rennie et al. | |
| 8,170,725 B2* | 5/2012 | Chin | B60W 40/09 340/439 |
| 8,180,547 B2 | 5/2012 | Prasad et al. | |
| 8,231,270 B2 | 7/2012 | Groeneweg et al. | |
| 8,275,522 B1 | 9/2012 | Groeneweg et al. | |
| 8,284,037 B2 | 10/2012 | Rennie et al. | |
| 8,410,945 B2 | 4/2013 | Breed | |
| 8,497,769 B2 | 7/2013 | Rennie et al. | |
| 8,583,333 B2 | 11/2013 | Rennie et al. | |
| 8,775,006 B2 | 7/2014 | Moshchuk et al. | |
| 8,818,606 B2* | 8/2014 | Lee | B60W 10/20 701/23 |
| 8,830,141 B2 | 9/2014 | Seder et al. | |
| 2005/0165886 A1 | 7/2005 | Tuer et al. | |
| 2008/0084283 A1* | 4/2008 | Kalik | B60Q 9/00 340/435 |
| 2009/0228172 A1 | 9/2009 | Markyvech et al. | |
| 2010/0004862 A1 | 1/2010 | Gentles et al. | |
| 2012/0109418 A1 | 5/2012 | Lorber | |
| 2013/0144521 A1* | 6/2013 | Mathieu | G01C 21/365 701/410 |
| 2013/0261846 A1 | 10/2013 | McQuade et al. | |
| 2013/0289798 A1 | 10/2013 | Lee et al. | |
| 2014/0002277 A1* | 1/2014 | Fulger | G01C 21/3415 340/905 |
| 2014/0196529 A1 | 7/2014 | Cronin et al. | |
| 2014/0214255 A1 | 7/2014 | Dolgov et al. | |
| 2015/0166072 A1* | 6/2015 | Powers | B60W 40/06 701/1 |
| 2015/0344038 A1* | 12/2015 | Stenneth | B60W 40/103 340/439 |
| 2016/0084661 A1* | 3/2016 | Gautama | G06T 11/60 701/400 |

FOREIGN PATENT DOCUMENTS

| | | |
|---|---|---|
| JP | 2013-206279 A | 10/2013 |
| KR | 2001-0016258 A | 3/2001 |

* cited by examiner

A BLOCK ON A RAMP

FREE BODY DIAGRAM OF JUST THE BLOCK

SYSTEMS AND METHODS FOR PREDICTING WEATHER PERFORMANCE FOR A VEHICLE

CROSS REFERENCE

This application is a continuation application of U.S. patent application Ser. No. 14/516,309, filed Oct. 16, 2014, and claims the benefit of the filing date of U.S. Provisional Application No. 61/892,166 having a filing date of Oct. 17, 2013, the entire contents of both applications are incorporated by reference in their entirety as though set forth herein.

FIELD OF THE INVENTION

The present invention relates to a system including a set of sensors capable of collecting information on the environment of a vehicle-ground interface, and methods for the use of this information to improve vehicle safety.

BACKGROUND OF THE INVENTION

Environmental conditions significantly impact vehicle behavior. This is most commonly noted as degradation of vehicle stopping capabilities in inclement weather such as snow or ice. Such degradations mean that driver behavior should ideally adapt to match immediate road conditions, and that in some cases drivers should entirely avoid areas deemed to be too dangerous, for example those with "black ice".

Road conditions can be generally estimated based on known weather conditions. However, both weather conditions and road temperatures can vary dramatically over short distances, so that general area weather forecasts are insufficient to provide specific driving advice to a vehicle in a particular area. Thus, more granular data on weather, and specifically on road conditions, would be of value to improve the safety of drivers.

Stopping distance and general vehicle safety also depends dramatically on the specific vehicle being driven. Vehicle stopping distances may vary based on vehicle model, vehicle weight, brake quality, and tire tread conditions. Thus, in a defined road location two vehicles with different characteristics may experience dramatically different stopping distances. As a result, knowledge of the weather or road conditions themselves are not sufficient to ensure driver safety.

The interplay between vehicle and road at a given instant is considered as an input in existing anti-lock braking systems (ABS). In such systems, the tangential acceleration of one or more wheels is measured and compared with the acceleration rate of the vehicle. Because the tire has lower mass than the vehicle it can decelerate much more quickly than the vehicle, and as a result the tire can "lock" in a state where it does not rotate. This locking is undesirable, because the co-efficient of friction of a tire in its locked state is substantially lower than the optimal coefficient of friction for that tire.

ABS uses a closed-loop control process to optimize the amount of rotation in the tire, and thus optimize coefficient of friction. In ABS, the amount of force applied to the brakes is automatically relaxed if lock (or, more generally, slip) is detected in order to allow the tire to rotate again. The braking is re-established once rotation is sensed. Ideally, this system functions so that the optimum coefficient of friction (corresponding to an optimum amount of tire slip) is maintained during braking.

While the above closed-loop system can provide excellent control over vehicle braking in an emergency situation, it is not capable of making predictions of future vehicle safety performance, or of assessing its performance versus a baseline. While ABS assures "optimum" braking for the particular emergency case, there is no ability to analyze whether this "optimum" is good enough—whether it represents a safety performance level that will be satisfactory in other situations.

Thus, while it is possible to provide general advice for a generic vehicle during inclement weather, and it is possible to optimize the safety of a specific vehicle after a loss of control has occurred, it is not currently possible to provide targeted advice to a vehicle about how well it can perform in specific weather conditions and/or upcoming road conditions.

SUMMARY OF THE INVENTION

The presented inventions are directed to a system that includes sensors and sensor systems, and methods for analyzing data from these sensors, in order to measure characteristics of the tire/road interface in varying environmental conditions, as well as to provide information, guidance, and predictions to drivers, fleet managers, traffic managers, safety services, navigation and/or self-driving vehicle systems, models, services and other interested parties that use weather information and predictions.

One aspect of the invention is the fusion of multiple sensors, sources of information (including databases) along with models to create or provide information that is not available through the individual sensors alone. In effect, many sensors are actually effected through sensor fusion—for example, differential GPS is effected using the outputs of more than one GPS sensor. If the sensors are not conveniently co-located, the communication system(s) become an integral part of the sensor fusion. In many sensor fusion applications, processing power and modelling are also an integral part of the sensor fusion. Data used in the model (s)—say data from a database—may become, in essence, another sensor that is fused. An example here would be the street map database for a Geographic information system (GIS) being fused with GPS information to display a real time position map on a smartphone of a moving cars position.

In one embodiment, sensor fusion is done before transmission to reduce the use of limited bandwidth, and to reduce the costs associated with using costly bandwidth (e.g. cell connections). In another embodiment, models reside on the sensor or hubs processor to reduce the costs or bandwidth of transmission, and these models may be updated using OTA.

In some embodiments, the presented inventions includes inertial measurement sensors comprising accelerometer(s), gyroscope(s), and/or magnetometer(s) that are added to a vehicle to measure its motion. In some embodiments, these inertial measurement sensors are added directly to one or more wheels of the vehicle to measure its tangential motion, velocity, and/or acceleration. One or more such sensors may be added to a non-rotating member of the vehicle such as the bumper to measure its linear and angular motion and or position. In some embodiments, the sensors are added at the lug nut of the wheel to capture tangential acceleration at this position. In other embodiments, one or more sensors are added to a tire pressure monitoring system (TPMS), or affixed inside or outside of the tire or axel.

In one aspect of the presented inventions, sensor data is used to compute coefficients of friction and slip ratios for the vehicle in certain situations. For example, the wheel rotational acceleration and/or velocity are compared with the linear vehicle acceleration and/or velocity and the difference between the two are computed in order to provide an estimate of coefficient of friction and/or slip ratio. Multiple such measurements may be utilized to generate curves, equations and/or tables of coefficient of friction vs. slip ratios. Likewise, such curves, equations and/or tables may be generated for differing environmental and/or road conditions. In another example, the change in velocity and/or acceleration of a vehicle is calculated during a braking situation in order to provide an estimate of coefficient of friction. In some embodiments, this rate of change is measured by using GPS to identify the known distance over which braking has occurred, and measurement of the total time of braking in order to establish the time over which braking has occurred. In some embodiments, the wheel rotational orientation and vehicle speed along a road with a known geometry is measured in order to estimate the weight of the vehicle. In some embodiments, sensors such as radar, lidar, sonar, or (e.g. 3D) computer vision are used to measure/estimate the distance to other objects, which can be combined with stopping distance information to provide safety information. In some embodiment, computer vision is used to determine visibility, weather conditions (e.g. sleet hail, or black ice), road conditions (e.g. potholes and buckling) and roadside hazards and issues (e.g. semi-tractor trailer tires that have been shed, dead animal etc.). In other embodiments, the tire pressure is measured in order to estimate the vehicle's tire radius and/or contact surface with the ground.

In another aspect of the presented inventions, profiles of coefficients of frictions and slip ratio and plots of coefficient of friction (COF) versus slip ratio for a vehicle are compiled over time, across a variety of road environments. In one embodiment, these profiles are tagged with information about geographic position and/or are tagged with information about time. In one embodiment, these profiles are tagged with information about environmental conditions. Such environmental conditions may be identified from information provided from the National Weather Service or National Center for Atmospheric Research's (NCAR's) Pikalert system, Road Weather Information System (RWIS), Meteorological Terminal Aviation Routine Weather Report (METAR) or Terminal Aerodrome Forecast (TAF), UCAR's Location Data Manager (LDM) Etc. In another embodiment, the environment conditions are derived, at least in part, by sensor(s) on or near a vehicle at the time the measurements relating to coefficient of friction and slip ratio are taken. In one embodiment, local precipitation is measured using a precipitation gauge mounted on the vehicle, for example on the front windshield. In such an embodiment, the type of precipitation (e.g., rain, snow) is measured directly by the precipitation sensor or inferred from a combination of sensor measurements. In one embodiment, local road temperature and conditions are monitored by an infrared camera mounted to the vehicle, for example on the vehicle bumper. Likewise, light or camera sensors may be used to detect/measure cloud cover. Further, motion sensors may be used to detect/measure wind velocity and gusts.

In one embodiment, at least one of these sensors communicates to a hub device using a wireless communications protocol. In one embodiment, this wireless communications protocol is Bluetooth or Bluetooth Low Energy. In one embodiment, this wireless communication uses a technique other than conventional electromagnetic radiation, such as magnetic or acoustic communication. In one embodiment, the hub device is a cellular phone. In one embodiment, this cellular phone has one or more applicable sensors, such as an Inertial Measurement Unit. In one embodiment, the hub is connected to the On Board Diagnostics (OBD) system of the car, drawing power and/or measurements from the OBD. In one embodiment, the hub is a device capable of running many applications that make use of the systems capabilities (e.g., an Android device).

In still another aspect of the presented inventions, the COF or COF vs slip ratio curve for a vehicle are predicted for future environmental conditions and/or future road conditions based on the past COF performance of the vehicle. In one embodiment, the future environmental condition is chosen based on a vehicle's expected travel path. In one embodiment, the future environmental condition represents the present environmental condition at a location that the vehicle will soon be in. In one embodiment, the future environmental condition includes a prediction of the environmental state of that location based on a combination of the present environmental condition and a model that predicts environmental changes. In one embodiment, the future environmental condition is derived at least in part from a report from the National Weather Service. In one embodiment, the future environmental condition is derived at least in part from environmental data taken at that location by fixed sensors. In one embodiment, the future environmental condition is derived at least in part from environmental data taken at that location by mobile sensors. In one embodiment the mobile sensors are affixed to other vehicles. In another embodiment, future road conditions are derived at least in part from road condition information taken by mobile sensors. In one particular embodiment, future or upcoming coefficient of friction information and/or environmental information for a travel path of a vehicle are provided to the vehicle. This upcoming road surface information may be utilized with stored profile information of the vehicle to determine vehicle specific safety information and/or to generate warning outputs.

In yet another aspect of the invention, the future COF is obtained by matching the previously measured COF values and/or curves with environments that resemble the future environment, and selecting COF values that most closely match that environment. In one embodiment, the future COF is obtained by first building a model for COF as a function of environmental conditions for a particular vehicle, and then extrapolating from this model to predict the COF for these future environmental conditions. In one embodiment of the invention, data from one or more sensors, vehicles, etc., is stored in a computer database. In another embodiment, models are constructed using Big Data (data analytics/predictive analytics) methods and/or control theory methods such as system identification.

In further aspects of the invention, COF and COF versus slip ratio data for a plurality of vehicles are compiled to form a library of COF data. In one embodiment, data from more than one vehicle in this library is combined to form at least one element of an assessment of road conditions in a specific location common to these vehicles. In one embodiment, the future COF of a first vehicle is predicted based on a mathematical model which comprises data from vehicles other than this first vehicle.

In still yet another aspect of the invention, the driver, owner, insurer, or other interested party of a vehicle are alerted to the potential for poor safety performance at a future time. In one embodiment, the interested party is notified if the vehicle's future path is anticipated to take the vehicle to a location where its predicted COF will be below a threshold level. In another embodiment, the interested party is notified if the COF is predicted to fall below a threshold value in weather conditions that are common to the vehicle location. These alerts may be output in any appropriate manner to a driver of the vehicle and/or to vehicle systems (e.g., traction control).

DESCRIPTION OF THE INVENTION

Figure 1:
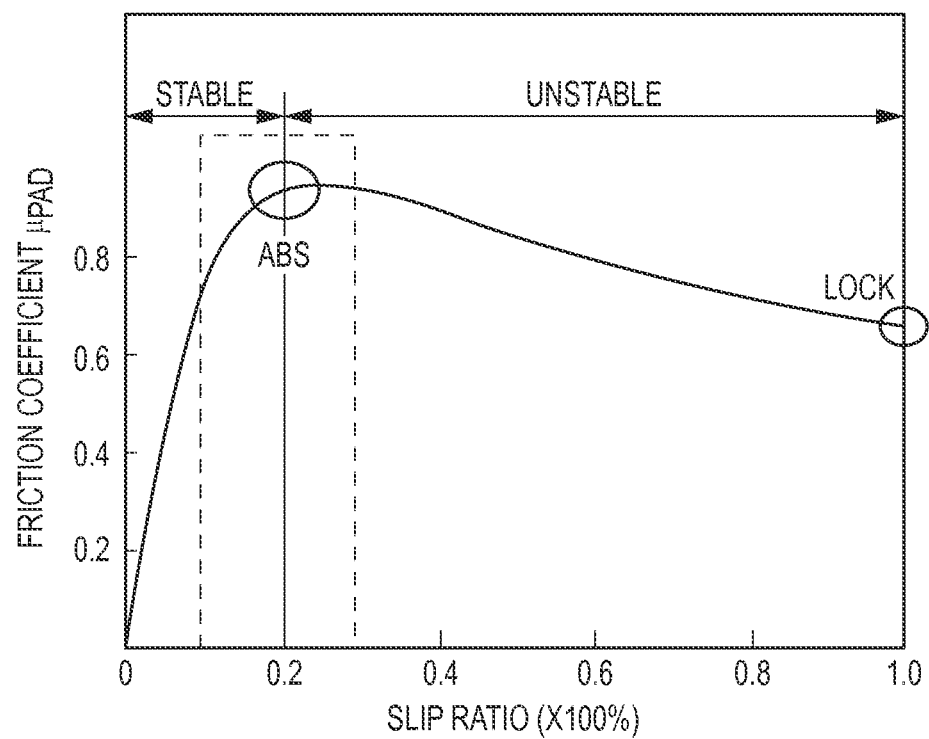
FIG. 1 shows a relationship between COF and slip ratio.

The present invention identifies new and surprising methods for improving vehicle safety by enabling prediction of coefficient of friction, slip ratio, and/or stopping distance for a specific vehicle at a time in the future. The present invention includes sensor(s) and components that perform analysis techniques to customize a prediction to a particular vehicle in order to optimize the utility of the information.

Generally, aspects of the presented inventions use techniques of "information fusion" to create new information. A definition of information fusion is provided by the International Society of Information Fusion: "Information fusion is the study of efficient methods for automatically or semi-automatically transforming information from different sources and different points in time into a representation that provides effective support for human or automated decision making" These different sources can include at least two elements from the classes comprising sensors, external data sources, mathematical models, algorithms, etc., as well as combinations of these elements that may be generically described as sensors in these descriptions Information fusion can be used to combine measurements/data (and information) from more than one source—often in concert with models in ways that allow one to access information and make predictions about quantities and qualities using sensor fusion and/or information fusion that are not present in any raw measurements/data from one source. A model in this context represents a mathematical representation of a physical system, wherein, for example, the physics of one characteristic can be estimated or predicted based on input values from other characteristics, and includes a broad range of techniques such first principle dynamic models, statistical models, system identification, and neural network and deep learning systems. Data generated by such a process can be broadly called "fusion data", and may be used directly or serve as an input to another model.

This analysis can result in an estimate of a characteristic of a system that is not directly measured by the sensors. Additionally, one can fuse two measurements of similar quantities into improved information, for example using two measurements—one accurate not precise, and one precise but not accurate—into an estimate of the quantity which is both more accurate and precise.

Sensors and information sources which have applications to vehicle sensor/information fusion and or safety include: vehicle sensors networked to the On Board Diagnostics (OBD, dashboard cameras (including dual, three-dimensional, and array cameras, and rearview/backup and/or 360 view cameras, as well as driver and passenger facing cameras), spectroscopic sensor systems, visibility sensors (e.g. extinction coefficient backscattering sensors or integrating nephelometer), sensors such as magnetic loops, micro radar, temperature, and magneto-restive wired and wireless sensors (which may or may not be embedded in the pavement), toll-taking sensors (including RFID, DSRC, and other technologies), distrometers, particulate counters, and ceilometers, lightning sensors, linear optical arrays, proximity detectors, magnetic position sensors, gas sensors, color sensors, infrared pyrometers (especially in linear arrays) and cameras (e.g. temperature sensors), RFID and other location tagging, blind spot sensors such as radar, car ahead-behind distance sensors, and pavement sensors optical and spectral analysis sensors, battery "fuel gauges", infrared pyrometers, and location technologies such as GPS, Galileo, and Glonass, as well as integrated systems such as GNSS, sensors for precipitation type and amounts, wiper sensor, irradiance and UV/IR sensors (useful both for weather measurements and as instrumentation for estimating available Photovoltaic energy), cloud sensors, roadside snow sensors, computer vision (e.g. sensing lane markers, other vehicles, and roadside traffic markers), lightning sensors, barometric pressure, particulate count, and pollution and chemical sensors, sonic sensors and microphones (e.g. sensors for use in creating sonic profiles of road and tier noise and/or doing FFT analysis of sounds, for the purposes of sensing road surface type, road surface conditions, and precipitation-tire interaction), range finding sensors (e.g. distance to vehicle in front/back), mems sensors, etc. Sensors may also be in the form of information from vehicles and vehicle management systems, such as traffic jam auto drive, auto park, parking space management, and GIS systems with mutli-layer data sets about vehicles, conditions, weather, predictive analytics, etc. Sensors may be the outputs of smart phone and/orcar sensor sets—connected to internet via cell, wifi, Bluetooth, etc. Smart phones themselves make excellent information fusion devices, containing a growing number of sensors and communications methods, as well as ever-increasing processing power and access to algorithms and databases via the internet.

These sensors can, as is appropriate, be connected sensors on vehicles, infrastructure, or persons, be part of connected technologies such as smart phones, smart watches, personal computers, vehicle instrumentation, be part of safety systems such as National Weather Service warning systems, police and fire response, traffic accident reports and lane closure warnings, General Motors OnStar system, etc. Sensors may also be in the form of crowd-sourced information, databases information, broadcasts, etc.

Sensors, information databases, models, processing power (including cloud technologies), and other elements of information fusion are now often distributed, and thus communications between these elements may be critical. Cell communications have become ubiquitous methods of communication, and have become well integrated in vehicle applications—standards include GSM (Global System for Mobile Communications, a de facto global standard for mobile communications that has expanded over time to include data communications. Other standards include third generation (3G) UMTS standards and fourth generation (4G) LTE Advanced standards. Additional communication methods applicable for the invention include: Satellite internet and telephony, Bluetooth and Bluetooth low energy, wifi, using regulated and unregulated frequency's (such as ISM), whitespace, DSRC (Dedicated Short Range Communications) including but not limited to vehicle to vehicle (including ad hoc networking for passing info such as braking, swerving, GPS position and velocities for avoidance, or in our case COF-Slip) and vehicle to infrastructure (such as traffic signals and signs), radio, repeaters, VHS (such as aircraft bands), infrared, spread spectrum, mobile ad hoc networks (MANETs) and mesh networks, public information systems such as the 5-1-1 telephone car information system (road weather information, ans transportation and traffic information telephone hotline) and National Weather Service Emergency Broadcast systems, and police, fire, ambulance, and rescue bands and systems. This list (and others in this specification) are to be considered illustrative and in no way limiting.

In one embodiment, input to a model takes the form of a specific measurement (e.g., a value). Input to a model can also take the form of a relationship between two variables, which together define a curve. An example value is the instantaneously measured wheel slip ratio of a vehicle. An example curve is a plot of a relationship between wheel slip ratio and COF for a specific environmental condition. A curve includes measured data and/or data extrapolated from models.

In one embodiment, input to a model takes the form a more complex "profile", which includes an array of data associated with a given vehicle. An example profile in this invention is an array of COF versus slip ratio curves for a single vehicle in a number of different environmental conditions. In one embodiment, a profile includes measured data as well as data extrapolated from models. In one embodiment, this profile(s) is stored at the vehicle in a memory unit. In another embodiment, this profile(s) is stored remotely from the vehicle and is accessible by the vehicle and/or similar vehicles via a communications module. In the latter regard, vehicles that have not yet calculated a profile(s) or dot not have adequate sensors to calculate such a profile(s) can access pertinent profile information.

In one embodiment, input to a model takes the form of a "library". A library includes a set of multiple profiles. For example, such a library may include COF data from all vehicles that have passed by a particular location and/or includes COF data from a set of similar vehicles, or vehicles with similar tires, or of similar ages, etc. A library is used for inferring the anticipated characteristics of a specific vehicle by comparison with other, similar vehicles. A library includes measured data as well as data extrapolated from models.

Output from the model is termed a "prediction", and represents an estimate of the current or future state of a variable that is not directly measured by the sensors. An example prediction from a model is the maximum COF of a vehicle in environmental conditions in a region beyond the exact region of the vehicle at a particular moment. A "vehicle" in this invention can refer to one or more commonly used transportation systems, including a car, a self-driving car or drone, truck, etc.

One metric of the safety of a vehicle is the vehicle stopping distances. The stopping distance is determined by several factors, including the speed of the vehicle, the mass of the vehicle, and the coefficient of friction between the vehicle and the road. While the vehicle mass can be reasonably estimated by the driver, and its speed is constantly measured by the speedometer, the coefficient of friction is usually not known to the driver, as it is not measured or reported by vehicle systems. The coefficient of friction represents the most significant uncontrolled variable in vehicle safety. Worse, the coefficient of friction can change suddenly on a road, for example as a vehicle moves from dry road to a puddle, or from snowpack to black ice. As a result, road safety is best quantified through coefficient of friction, and means to both measure and predict coefficient of friction produce valuable safety improvements.

The coefficient of friction at the tire/road interface varies as a function of the "slip ratio" of the wheel, where a slip ratio of zero indicates a freely rolling tire, and a slip ratio of one indicates a completely locked tire. Without being bound by theory, it is believed that the coefficient of friction between tire and road has a maximum at a specific slip ratio. FIG. 1 shows a typical relationship between coefficient of friction and slip ratio. A relationship such as this is referred to as a "COF curve" for a specific road condition. Anti-lock brakes attempt to maintain the COF as close as possible to the maximum value of this curve during aggressive braking. A locked wheel has significantly lower COF than the maximum achievable COF, and is therefore to be avoided if possible. The exact details of this curve, including the COF maximum value, depend on the specifics of the tire, vehicle velocity, and the environmental conditions of the road (e.g., clean dry asphalt, dirt road, packed snow on concrete, etc.).

In one embodiment, the present invention produces one or more profiles of COF values and COF curves associated with a particular vehicle. See, for example, FIG. 13. The profiles are created by measuring COF and/or slip ratio using at least one sensor under at least two environmental conditions, and storing the values of COF and/or slip ratio in a database. Such profiles may be stored alongside descriptive information about the environment. The descriptive information may include time, location (e.g., as determined by GPS), other sensor information, local weather conditions, etc. The descriptive information may also include pointers to other information sets, such as weather databases, which are not locally included in the database. Further, such profiles may be periodically updated. This allows changing of a vehicle specific profile as conditions of the vehicle change. This may allow, for example, altering profiles as the tires of the vehicle wear.

The instantaneous ratio of the tangential velocity of the tire where it meets the road and the velocity of the vehicle to which it is attached is defined as the "Slip ratio". When braking (or accelerating) in a moderate manner, the tangential velocity of the tire where it meets the road is a little slower (or faster) than the relative velocity of the vehicle vs. the road itself, and the tire "slips".

Figure 2:
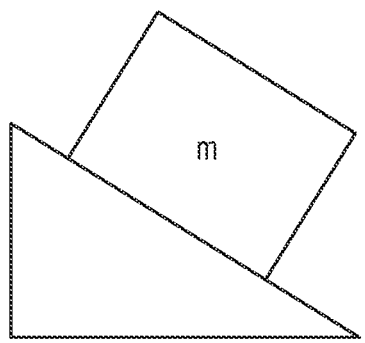
FIG. 2 shows an illustration of the forces impinging on a block sliding on an inclined plane.
Figure 2:
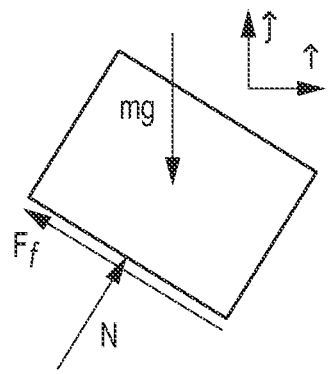

A vehicle safety system is most concerned with the sliding coefficient of friction, which will determine braking distance for a vehicle at a given mass and speed. The sliding (kinetic) COF is defined as $\mu_k=F_f/N$ where $F_f$ is the friction force between the vehicle and ground, N is the normal force (gravity) pushing the vehicle and ground together, and $\mu_k$ is the COF. This is conceptually the same formulation as for a block sliding along a plane, as illustrated in FIG. 2. A very slick surface will have $\mu_k \ll 1$, as the friction forces are very low. A tire on a high quality asphalt road will have a maximum COF of about 0.85.

When a vehicle is on a flat (non-inclined) surface, the force N=mg, where m is mass and g is gravitational acceleration. In some embodiments of the invention g=9.81 m/s, and in some embodiments of the invention g can be modeled or derived from a look-up table based on the exact location of the vehicle. The force N represents the force normal to the ground, and will change with the inclination of the vehicle. In some embodiments of the invention, inclination of the vehicle is measured or estimated using an inertial measurement system, which itself may include accelerometer(s), gyroscope(s), inclinometer(s), and/or magnetometer(s), where the information from the inertial measurement system is input into a model to calculate inclination. In some embodiments of the invention, inclination of the vehicle is further measured using global positioning system (GPS) data, which can infer inclination based on known topography of the roads, and can infer orientation based on known direction of travel and/or based on magnetometer measurements. In one embodiment, the inertial sensors are placed on a non-rotating member of the vehicle, such as on the front bumper. In some embodiments of the invention, inclination of the vehicle is measured using a bubble sensor. In any of these embodiments, the inclination is used to further inform the calculation of N and/or the calculation of COF.

In some embodiments of the invention the mass of the vehicle is estimated. In one embodiment, the mass is estimated based on a look-up table for the vehicle or is estimated using an optical imaging sensor which captures the size of the tire/ground interface for one or more tires. Based on the interface information and the known tire pressure as measured with the tire pressure measurement system, vehicle mass is calculated.

In some embodiments of the invention, COF is approximated using a formula that includes an input value $a_f$, defined as the difference between the instantaneous tangential acceleration of the tire where it meets the road and the acceleration of the vehicle to which it is attached. Because the mass of the vehicle is a component of both the friction force and the normal force, these cancel each other and the value $\mu_k=a_f/g$ is directly measurable. In one embodiment, $\mu_k=q \cdot a_f/g$, where q is a fitting factor which may depend on factors such as vehicle inclination or other sensor measurements as discussed above.

In the above embodiments, forces are calculated using a "grey box" approach that relies on some first principles calculations. In another embodiment, COF itself or the component q are calculated using a "black box" approach that correlates COF with data derived from inertial and other sensors using a multivariable calibration fit approach without reliance on a specific physical model.

Measurements of slip are also useful for characterizing vehicle performance. Such measurements are performed in the vehicle using a device such as a hall sensor that is built into the wheel for this purpose as part of an ABS system. In one embodiment, the invention tracks GPS position over time to establish vehicle velocity as an input to model slip. In this embodiment, the tangential velocity of the wheel(s) is measured using a gyro or set of gyros attached to the wheel(s), and this is input into a model for the calculation of slip. In some embodiments, data from the accelerometer(s) is used as an input to improve the estimation of the velocity of the vehicle and/or wheel(s), where a velocity at time $t_n$ may be estimated based on knowledge of the velocity at a time $t_m$ and the acceleration $a_{n-m}$ during this time.

Figure 3:
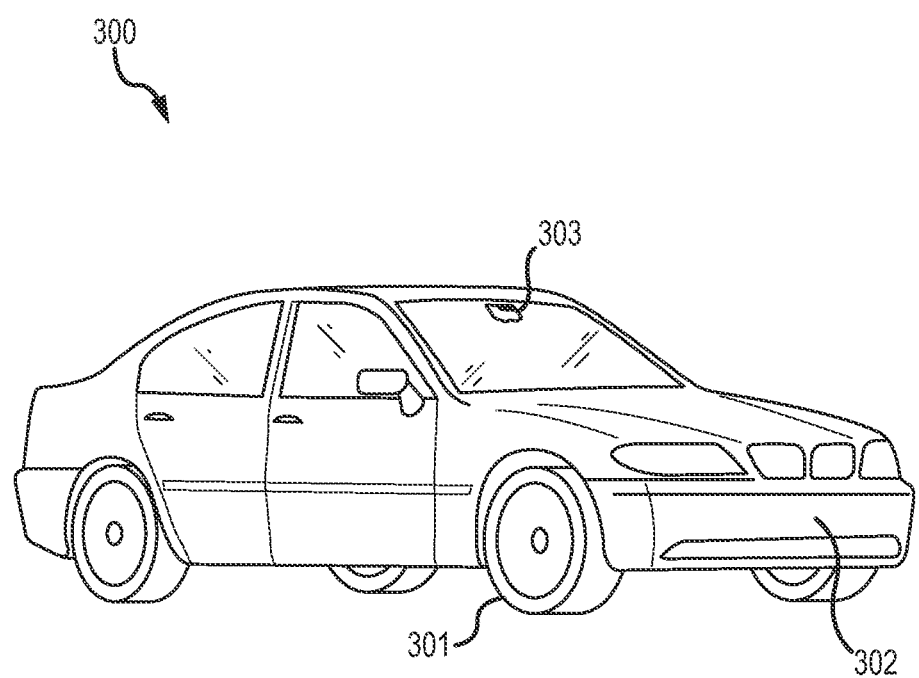
FIG. 3 shows a perspective view of a vehicle with sensors formed in accordance with embodiments of the invention.

In one embodiment, measurements of both COF and slip are made using the same or overlapping sets of sensors. In another embodiment, slip may be inferred or calculated based on COF information. In one embodiment, data is received from inertial measurement sensors disposed on at least one rotating member, and on at least one non-rotating member. FIG. 3 shows an exemplary arrangement of sensors on a vehicle 300, with a sensor or set of sensors 301 disposed on a wheel lug nut, and a sensor or set of sensors 302 disposed at the front bumper. FIG. 3 also shows an optional sensor or set of sensors 303 disposed on the windshield, which can be used for at least detecting precipitation. These locations represent one set of possible placement of sensors, and are not meant to be limiting.

The sensors are in wired or wireless communication with each other and/or with a central communications node (device), which may be inside or outside the vehicle, and which provides communication with the outside world. In one embodiment, communication between the sensors and the communications node is accomplished through Bluetooth LE. In one embodiment, a sensor may connect to a second sensor but not have a direct connection to the communications node, and in so doing, the sensors form a mesh network. Wireless communications systems may require antennas, and antenna placement, polarization, and directionality may be important for the application. In one embodiment, a sensor or communications hub is placed inside the vehicles windshield, where the signals satellite communications, GPS, infrastructure, and other sensors are unimpeded, or where the signal path to other sensors has the least obstruction (e.g., metal shielding). In another embodiment, the directionality, polarity, placement, and signal output timing of a wheel mounted sensor is chosen so as to improve the reception strength at another sensor, communications hub, or device (e.g. transmission occurs during periods when the hub of the wheel is not obstructing the signal as the sensor rotates with it).

Figure 4:
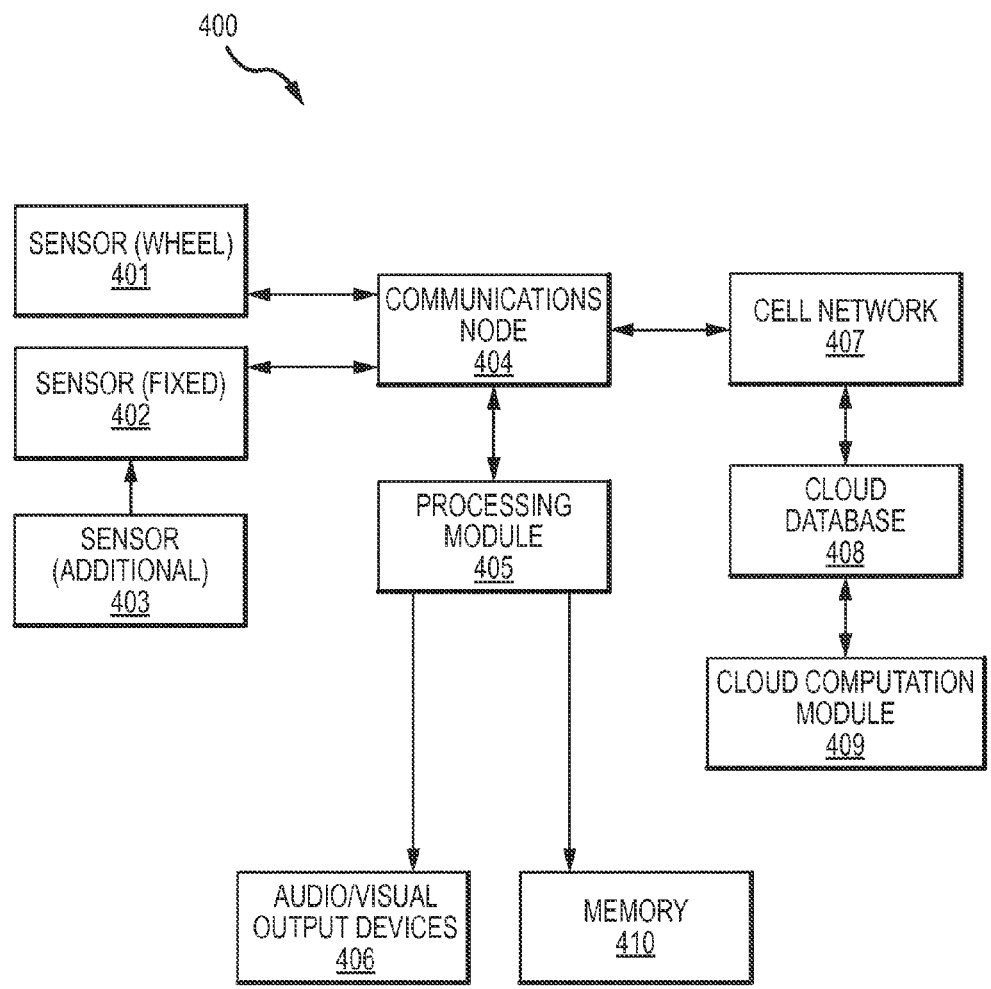
FIG. 4 shows a block diagram of communication and processing systems formed in accordance with various embodiments of the invention.

FIG. 4 shows an exemplary system 400 that includes a wheel sensor 401 and a fixed sensor 402, which are in data communication with a communications node 404. To illustrate the potential use of a mesh network, the communications system 400 also includes an additional sensor(s) 403 which communicates to the fixed sensor(s) 402, but not directly to the communications node 404. The sensor 402 or 401 relays data from the sensor 403 back to the communications node using a wired or wireless connection. This may favorably save power in some configurations, depending on factors such as the distance of the sensors 401-403 from each other and from the communications node 404. Note that this configuration is not meant to be limiting, merely illustrative. In one embodiment, a communications network might be established up from the individual sensors via BLE to the hub on one vehicle, via a cell network from that vehicle to the cloud, then through the internet and out via wifi connections of passing homes or businesses to a second vehicle, then between that vehicle and a third vehicle using Bluetooth or DSRC. In another embodiment, the houses or businesses might have sensor suites themselves, and pass information via wifi to the cloud, or via wifi or Bluetooth to passing vehicles. In yet another embodiment, roadside infrastructure (e.g. stop signs or streetlights) might be outfitted with sensors and/or communications hubs powered by photovoltaics, and communicate to the cloud via satellite internet, and to passing vehicles using DSRC or wifi.

Figure 13:
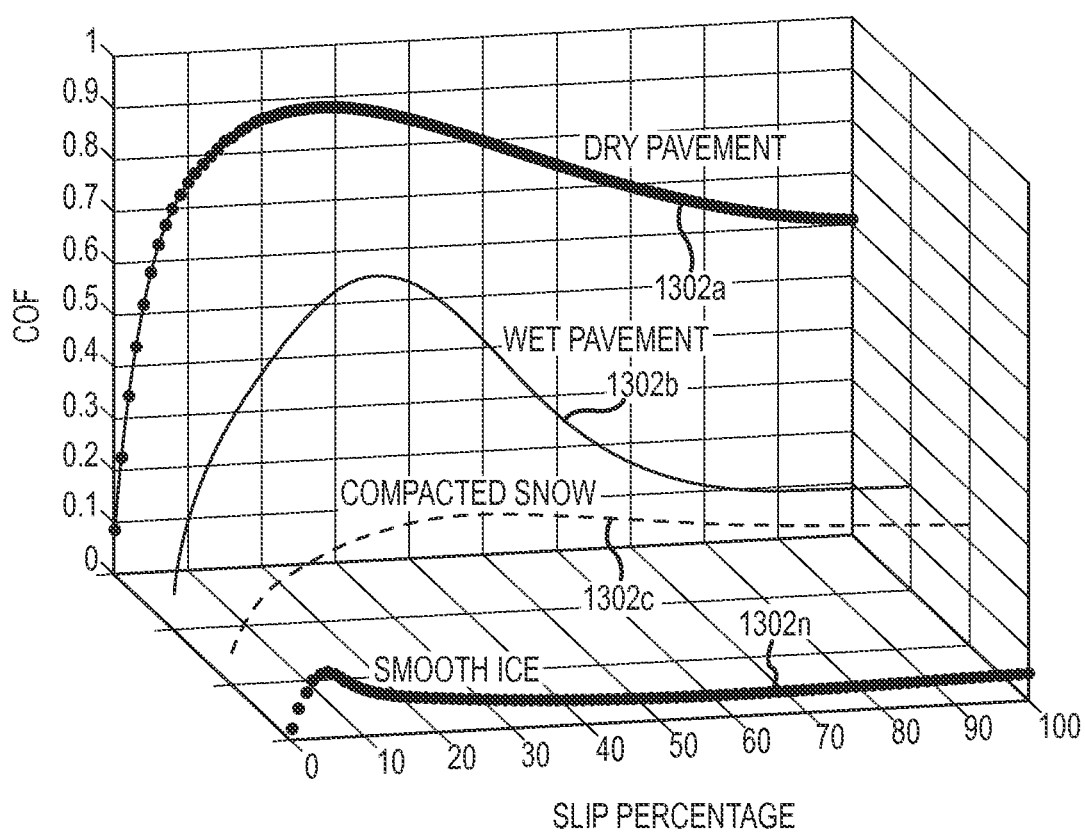
FIG. 13 shows exemplary COF/slip profiles for a vehicle for different environmental/road conditions.

The communications node 404 passes sensor data to an on-board processing module 405 which aggregates data from each sensor 401-403. The communications node 404 may also be in contact with an external network such as a cellular network 407, and may pass data via the cellular network 407 to a cloud database 408 and a cloud computing module 409. The system of this invention may either use cloud computing module 409 or the on-board processing module 405 to process data from the sensors 401-403 and from the cloud components 408, 409. The on-board processing module 405 sends an alert to the driver via an output device(s) 406 if a threshold danger probability is reached. The output device(s) 406 includes audio, visual and/or tactile systems in the vehicle. In some embodiments, the on-board processing module 405 is configured with system memory, which may store the one or more profiles of the vehicle. In some embodiments, this stored profile(s) includes a family of COF vs slip ratio curves. FIG. 13 shows exemplary COF/slip profile curves for a vehicle for different road environmental conditions (e.g., dry pavement, wet pavement, compacted snow, smooth ice (i.e., black ice)). In some embodiments, the on-board processing module 405 is configured to retrieve profile information as an input into a model and/or for use with one or more inputs to, for example, make predictions about vehicle performance or estimations of environmental conditions.

In some embodiments of this configuration, the sensors 401-403 may send raw data to the communications node 404 or to each other. In some embodiments of this configuration, the sensors 401-403 further include onboard processing to reduce the data set and/or fuse information from one or more sensors, and thereby reduce the total communications overhead. The decision of whether to process the data on an on-board processor or send raw data to the communication node 404 depends on the relative power and bandwidth requirements of each mode of operation, and may differ for different sensors and/or locations of the sensors. Bluetooth Low Energy communication represents an exemplary communications operational mode, as it supports a star architecture, with the central device able to connect many peripheral devices, and supports over-the-air updates. In one embodiment, devices coordinate to "sleep" between short transmissions, significantly reducing power use. Alternatively, information may be stored and transmitted in bursts on higher-bandwidth, higher power-use devices such as standard Bluetooth or wifi. In that case, these devices may be powered down between bursts of transmission to save power.

In one embodiment, communications are accomplished through means other than radio frequency transmission, including wired transmission, optical transmission, acoustic transmission, magnetic induction, or transmission of electrical signals through the body of the vehicle, or through the vehicles on-board diagnostics (OBD), etc.

In one embodiment, one or more of the sensors 401-403, on-board processing module 405, and communications systems 404 are powered by scavenged power (also known as power harvesting or energy scavenging). Energy is derived from external sources constantly during use, or is derived intermittently and stored on battery, capacitor, super capacitor, etc. Example power sources include solar cells, kinetic energy devices that derive power from vibrational, rotational, linear, or other motion of the vehicle, or a harvesting ambient radiation source device (e.g., antenna collection of energy from radio waves, such as in a Powercast system, or via wifi or DSRC power scavenging). In one embodiment, a radio source is provided in the vehicle to create radio waves which are harvested by the sensors. In one embodiment, the sensors are equipped with Piezoelectric, Pyroelectric, Thermoelectrics, Electrostatic (capacitive), Magnetic induction, Mechanical, or Micro wind turbine energy harvesting capability. In one embodiment, a magnetic induction or piezo element is included in a sensor pack to harvest vibrational energy. In one embodiment, the rotation of the tire causes a magnet to move due to changing gravitational field and/or centripetal forces, inducing power in a coil for use in the system.

The system 400 may optionally include a memory device (or devices) 410 that stores information (wheelbase, tire types, deceleration/acceleration capabilities, etc.) pertaining to the host vehicle, or stores data when communications are interrupted or non-existent The processing module 405 uses stored information to generate profile information (described later). The memory 410 may also store raw and/or processed sensor information, road type/condition information and weather information. The road type/condition information and weather information as well as other information are received at the system 400 from an external source via the communications node 404.

Figure 5:
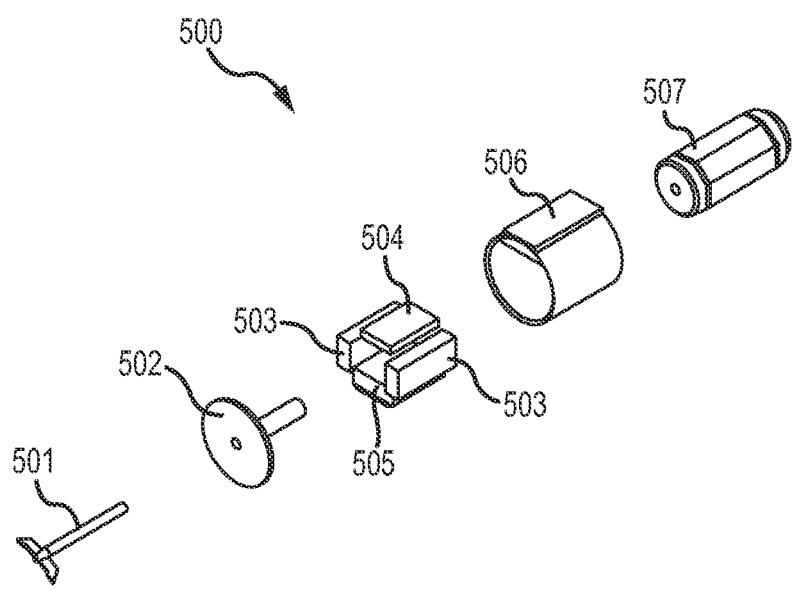
FIG. 5 shows an exploded view of a lug nut sensor formed in accordance with one embodiment of the invention.

FIG. 5 shows a lug nut sensor 500 that is to be attached to a vehicle wheel. In this embodiment, the lug nut sensor 500 includes a screw 501 which threads through a tire package cover 502 to unite with a sensor package housing 506 and the lug nut 507. The housing 506 includes two lithium polymer batteries 503, an inertial measurement unit 504 having an accelerometer and gyroscope, and a microprocessor 505 with Bluetooth communications capability. In one embodiment, the accelerometer includes one 6 g 3-axis accelerometer with axes pointing radially, laterally, and tangentially with regard to the tire. In one embodiment, the sensor system 500 includes one additional 120 g one-axis accelerometer for direct measurement of radial accelerations at high speeds. In one embodiment, the microprocessor 505 calibrates the sensor, samples data, and filters it to produce measurements in radial, tangential, lateral axes of the tire. Such calibration is a typical sensor fusion application—e.g. gyros are prone to drift, but this can be compensated for in a full inertial measurement unit. Velocity measurements made using gyros on the tires can be undrifted GPS or accelerometers, etc. This sensor may of course alternatively be affixed to the outside of the vehicle wheel (e.g. using two-sided tape) or to the inside of the vehicle (e.g. attached to a band running along the inside of the hub).

To calibrate the tangential acceleration (y) measurement, in one embodiment the following approach is used:
1. At constant speed and perfect alignment, tangential acceleration (y) is 0;
2. Define calibrated x as positive to the "east" and calibrated y as positive to the "north"; and
3. At constant speed with misalignment angle θ, defined as a rotation of the system counterclockwise from x and y to $x_u$ and $y_u$, the calibrated x and y are $x = x_u \cos(\theta) + y_u \sin(\theta)$ $y = y_u \cos(\theta) - x_u \sin(\theta)$.

In one embodiment, the effects of gravity are averaged out by taking hundreds or thousands of measurements of $x_u/y_u$ to obtain average measurements $x_{u\_avg}$ and $y_{u\_avg}$. At constant velocity, y=0, and thus $y_{u\_avg} \cong x_{u\_avg} \tan(\theta)$, such that it is possible to calculate $\theta \cong a \tan(y_{u\_avg}/x_{u\_avg})$.

In one embodiment, tangential acceleration is determined by sampling acceleration data at >30 Hz, with a predefined rate of sampling (e.g., 250 Hz). In this embodiment, over a (for example) time of measurement, the max and min values of (calibrated) y are identified, which will roughly correspond to acceleration up and acceleration down, and which will vary by +1 g and −1 g from true acceleration. These measurements are averaged to cancel out the effects of gravity to obtain a tangential acceleration estimate. This value is updated to the processor node, and the measurement process is repeated.

In another embodiment, tangential acceleration is calculated using a Kalman filter algorithm. In an exemplary process, lug nut tangential acceleration is defined as being proportional to tire/road contact point tangential acceleration—if $R_{eff}$ is the effective radius of the tire (measured from tire axel to road), and $R_{hub}$ is radius of hub to lug, then $wheel_{tan\_acc} = R_{eff}/R_{lug} \, lug_{tan\_acc} + k$, where k is a cyclical component due to gravity. The constants $R_{eff}$ and $R_{lug}$ are set using system identification or a calibration scheme. A Kalman filter which estimates the tire position and velocity—and thus the direction of gravity—is used to filter out the cyclical acceleration components due to gravity and to noise.

In another embodiment, a commercially available 6-axis sensor (x, y, and z axis accelerometer and x, y, z axis gyroscope on the same silicon chip), is used to directly measure the orientation and angular velocity of the tire. Most such chips are (presently) limited to perhaps 16 g accelerations and 2000 degrees per second. Mounted even a few centimeters from the hub of the wheel (example near a lug nut), a vehicle traveling at highway speeds would saturate an accelerometer channel pointed along the radial axis, and a gyro revolving around the lateral one. This limits the ability to determine the angular velocity of the tire (and thus linear velocity of the vehicle). However, in one embodiment the axis of measurement is offset to reduce the magnitude of both the acceleration and angular velocity measured. This creates a very straightforward linear reduction in the measurement of the angular velocity if the vehicle is going straight, but creates a complex relationship between the angular velocities of the other axes when the auto is turning. Similarly, this can create a very straightforward linear reduction in the measurement radial acceleration (which can be used to estimate the angular velocity) if the vehicle is going straight, but creates a complicated relationship between the angular acceleration of the tire and the estimated angular velocity, and changes the relationship between the position components of the acceleration in the offset radial and tangential measurements. In some embodiments, these complexities are resolved through further processing in a grey box or black box model.

Figure 6:
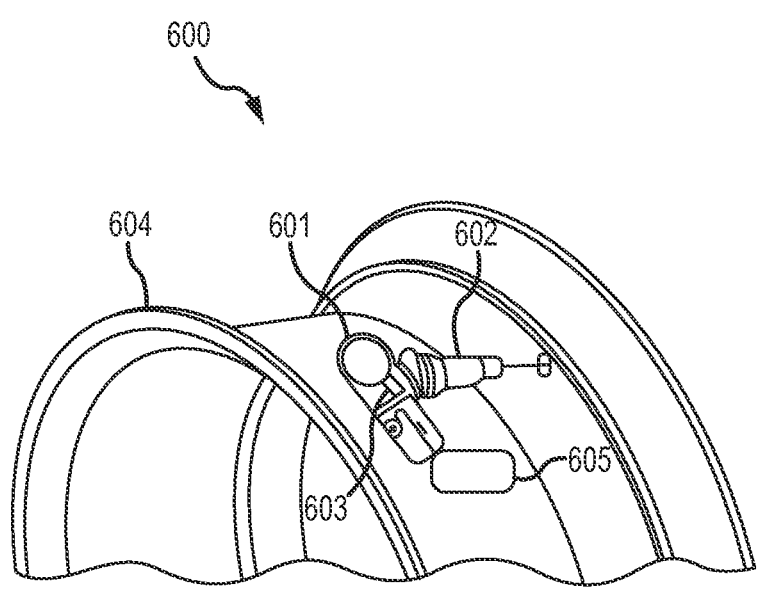
FIG. 6 shows an exploded view of a wheel-mounted sensor at or near the tire pressure measurement system formed in accordance with one embodiment of the invention.

FIG. 6 shows one embodiment of a wheel assembly 600 where a wheel inertial measurement sensor pack 605 is mounted at or near a tire pressure measurement sensor 601 in proximity to a valve stem 602 on a wheel 604. The sensor pack 605 is connected by a valve stem retainer screw 603, or alternatively is fixed in position by an adhesive.

In an alternate embodiment, the sensor set is affixed to the back of the wheel using an adhesive—the specific location can vary in implementation. In some embodiments, an antenna is added to the sensor system in order to improve communication capability with the communication node. In some embodiments, the tire stem is used as the antenna.

Figure 7:
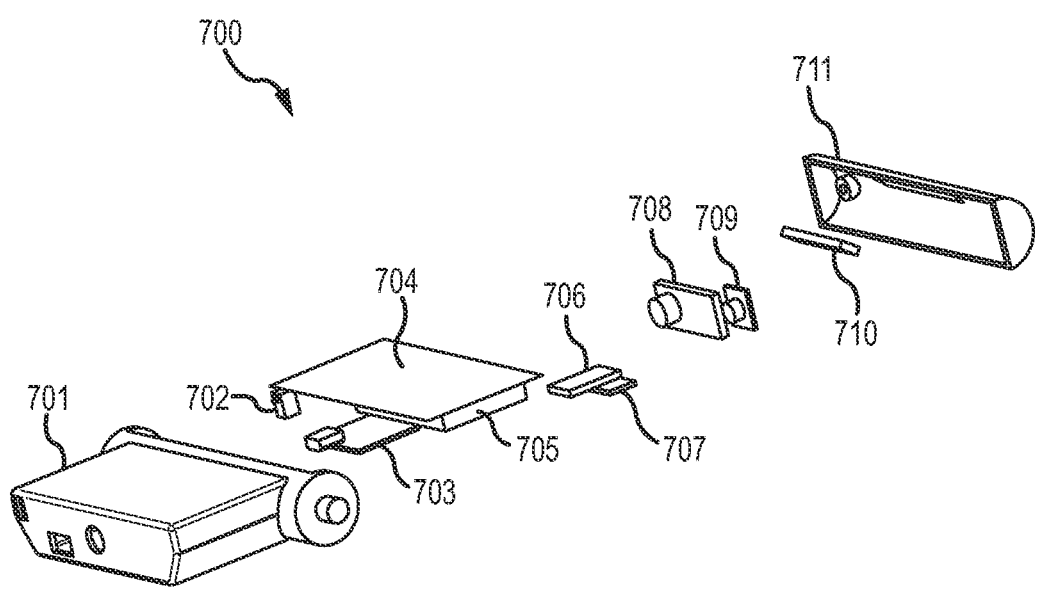
FIG. 7 shows an exploded view of a bumper sensor suite formed in accordance with one embodiment of the invention.

FIG. 7 shows a suite of sensors system 700 disposed on the front bumper. The system 700 includes a bumper sensor suite housing 701, a power switch 702, and a charge controller and voltage regulator 703 which controls charging of a battery pack 705 by a solar panel 704. The solar panel 704 provides power to the system, and may also usefully measure insolation power levels in real time, and therefore may also be used as a sensor. Other embodiments may utilize other power sources. The system 700 further includes a Bluetooth modem 706 and a microcontroller 707, which may be housed in the same package (e.g., a system on a chip) or in different packages. The system 700 may optionally include an infrared thermometer 708 and/or a microphone 709, as well as an inertial measurement unit (IMU) 710. A cover 711 protects the components of the system 700.

In one embodiment, the sensors of the system 700 identify road surface type (e.g., concrete, asphalt, gravel, dirt), condition (e.g., worn, cracked, potholed), and covering (e.g., black ice, lose or packed snow, slush, rain, dirt, etc.). In one embodiment, the sensor(s) measure ambient temperature and/or relative humidity. In one embodiment, the IR sensor(s) 708 measure temperatures in front of the front tires. The microphone sensor 709 measures sound that is analyzed by a processor to quantify road noise, which may be correlated to weather conditions. The IMU 710 includes accelerometers, gyroscopes, inclinometers, and/or magnetometers. In one embodiment, the sensors additionally include optical image sensor (not shown) that provides imaging data that is used by a processor to quantify visibility, particulate counts, cloud cover, etc. In one embodiment, this status of the headlights is determined using sensors.

Figure 8:
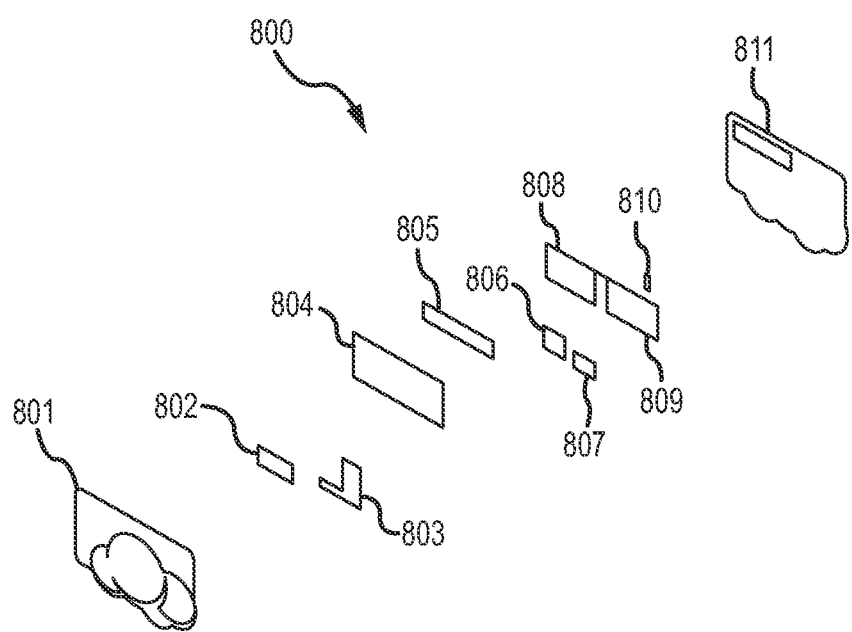
FIG. 8 shows an exploded view of a windshield sensor formed in accordance with one embodiment of the invention.

FIG. 8 shows an embodiment of a sensor that is attached to or near a windshield of the vehicle. The system 800 includes a housing 801, a charge controller and voltage regulator 802, sensor circuitry 803, a sensor battery pack 804, and a solar panel 805. The solar panel 805 provides power to the components, and may also usefully measure insolation power levels in real time, and therefore may be used as a sensor as well. The system 800 further includes a Bluetooth modem 807 and a microcontroller 806, which may be housed in the same package (e.g., a system on a chip) or in different packages. The system 800 may also include a capacitive sensor 808 and/or a swept frequency sensor 809, as well as an optional ambient light sensor 810. The system components are protected from the environment by a bottom level decal 811. Attaching sensors inside the vehicle (e.g. inside the passenger compartment, tire, or engine housing) may serve to protect the sensors from extremes of temperature, UV, humidity etc. The sensors may alternatively/additionally be protected using superominphobic coatings for lenses, cases etc.

Information gathered by the system 800 includes precipitation detection, fog, rain, snow, ice, visibility and cloud cover, and/or windshield wiper frequency. The system 800 can be mounted inside or outside of windshield glass. Mounting the system 800 inside will increase the package's life.

In one embodiment, the swept frequency sensor 809 includes a Swept Frequency Inductive Precipitation Sensor, such as that previously described in U.S. Pat. No. 6,388,453 B1. While '453 describes the use of sine wave sweeping to obtain a response, signals besides sine waves are used—for example, a complex frequency chirp is sent, and a controls theory/signal processing method called an empirical transfer function estimator (ETFE) is applied to determine transfer function. The empirical transfer function estimate is computed as the ratio of an output Fourier transform to an input Fourier transform, using a fast Fourier transform (FFT). The periodogram is computed as the normalized absolute square of the Fourier transform of the time series. Smoothed versions can be obtained by applying a Hamming window to the output FFT times the conjugate of the input FFT, and to the absolute square of the input FFT, respectively, and subsequently forming the ratio of the results.

In an alternative embodiment for sensing of wiper frequency or precipitation, a light source such as a laser is shone onto the windshield at an angle below (or above) the Brewster's angle of the glass while dry. Precipitation causes a change in the optical index system such that the light now is above (or below) the Brewster's angle. Then when the wiper blade cleans the glass, the system briefly reverts, allowing detection of both the precipitation and the wiper activation via this optical sensor.

In one embodiment of the invention, the precipitation sensor measures amount or rate of precipitation. In another embodiment of the invention, the precipitation sensor measures type of precipitation, for example by changes in light scattering associated with snow. In another embodiment of the invention, precipitation type is inferred based on a combination of sensor measurements and/or information from weather sensors external to the vehicle.

When the vehicle is operating, both slip and COF are calculated continuously as the vehicle runs based on a data set including at least data from the wheel-mounted IMU and the fixed IMU. If the environment were always constant, this information could be used to define a curve showing the relationship between COF and slip. However, because road conditions change as the vehicle moves, there is no single curve defining the performance of the vehicle, and a profile of curves is built.

In one embodiment, vehicle environmental conditions are separated by separating COF vs slip ratio data into different clusters of performance, using a technique such as K-means.

In a further embodiment, this data on COF vs slip ratio is added to a database alongside further information including time, location, traffic, road type, and/or environmental conditions local to the data capture event. Road conditions are quantified based on an estimated risk associated with the known road type, for example scoring 1=dirt road, 5=highway, etc. In one embodiment, road conditions are quantified based on a score derived from COF measurements made by multiple vehicles. Environmental conditions are quantified on one or more axis to enhance mathematical processing of the data. For example, environmental conditions may be scored in terms of ambient temperature (for example, in ° C.), road temperature (for example, in ° C.), insolation power (for example, in $W/m^2$), precipitation intensity (for example, in cm/hr), etc. In some embodiments, an aggregate environmental score is compiled based on the hazard implied by different environmental elements. In one embodiment, an aggregate environment score is compiled with information about known road type and known environmental conditions. For example, a bridge may receive a high composite score under warm, sunny conditions, but may receive a dramatically lower score under cold, snowy conditions.

Elements of the database which are measured in high confidence may be usefully employed to identify more accurate values for elements of the database which have lower confidence. In one embodiment, a measured COF or slip value may be used to estimate an environmental condition, or a known environmental condition may be used to estimate a COF or slip value.

Figure 9:
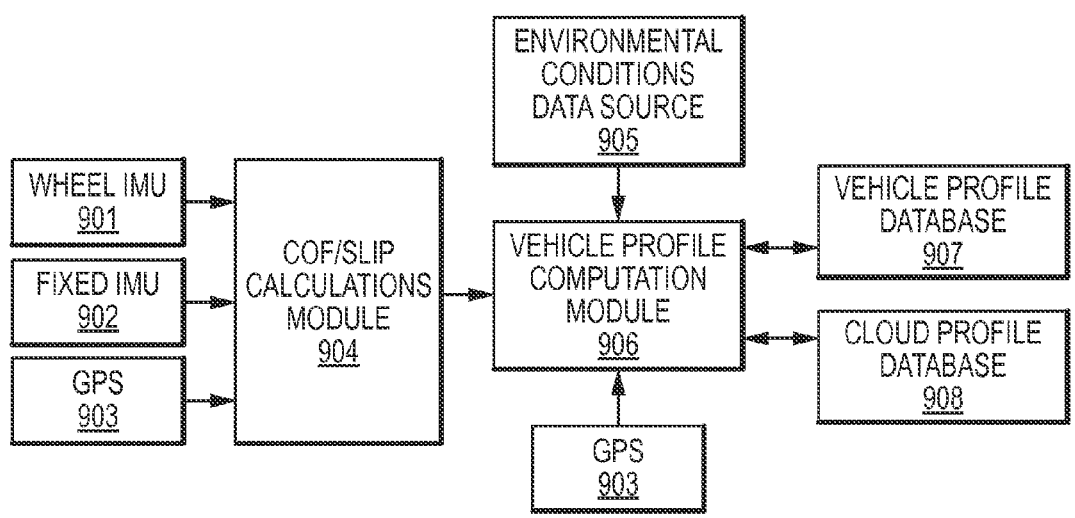
FIG. 9 shows an exemplary system that forms a COF/slip profile from sensor data.

In one embodiment, measurements of COF and slip in known good environmental conditions (e.g., warm and sunny) is combined to create a curve for the vehicle that is generally accurate for good environmental conditions, thus eliminating the previously stated difficulty of clustering data automatically. FIG. 9 shows a system that builds a profile, where information from wheel inertial sensors 901, the fixed inertial sensor 902, and optionally the GPS 903 are transferred to a COF/slip computational module 904, which calculates the local COF and slip ratio associated with this set of sensor data. This information is transferred to a vehicle profile calculator 906, which fuses the COF and slip ratio information with information from an environmental database 905 and/or GPS data to create a profile for the vehicle. This information may optionally be transferred to an onboard vehicle profile database 907 and/or a vehicle profile database 908 in the cloud.

Figure 10:
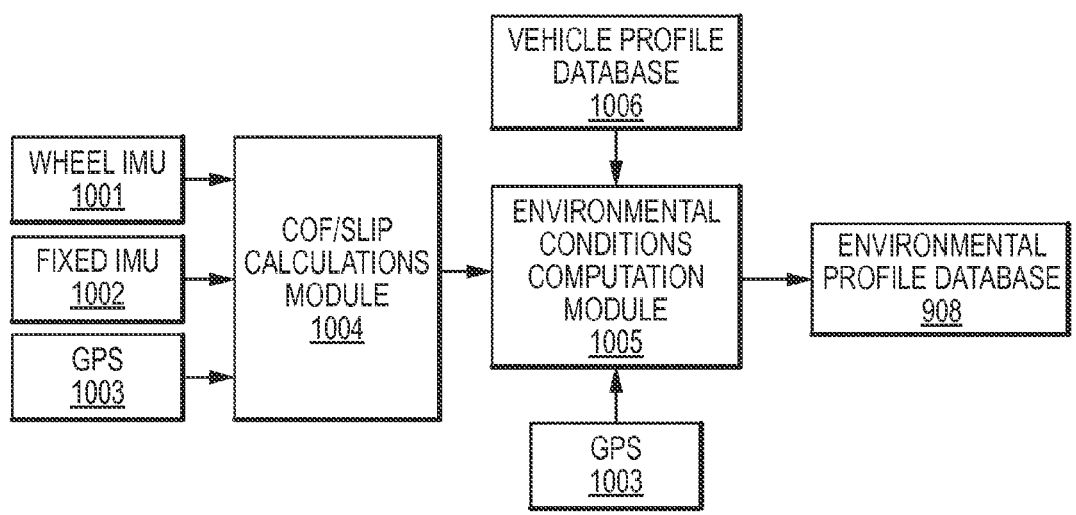
FIG. 10 shows an exemplary system that estimates current environmental conditions from sensor data.

In another embodiment, measurements of COF for a vehicle is used to successfully identify adverse environmental conditions such as black ice. In this way, hyper-local environmental changes such as icing are easily identified by examining the COF performance of the vehicle after a profile has been created. FIG. 10 shows a system that estimates environmental conditions, where information from wheel inertial sensors 1001, the fixed inertial sensor 1002, and optionally a GPS 1003 are transferred to a COF/slip computational module 1004, which calculates the local COF and slip associated with this set of sensor data. This information is transferred to an environmental conditions computation module 1005, which fuses the COF and slip information with information from the vehicle profile 1006 and/or GPS data to estimate environmental conditions for the vehicle. This information may optionally be transferred to an environmental profile database 908 in the cloud, where it may be usefully applied to warn other drivers of adverse weather conditions in the GPS location where the measurement was taken.

Figure 11:
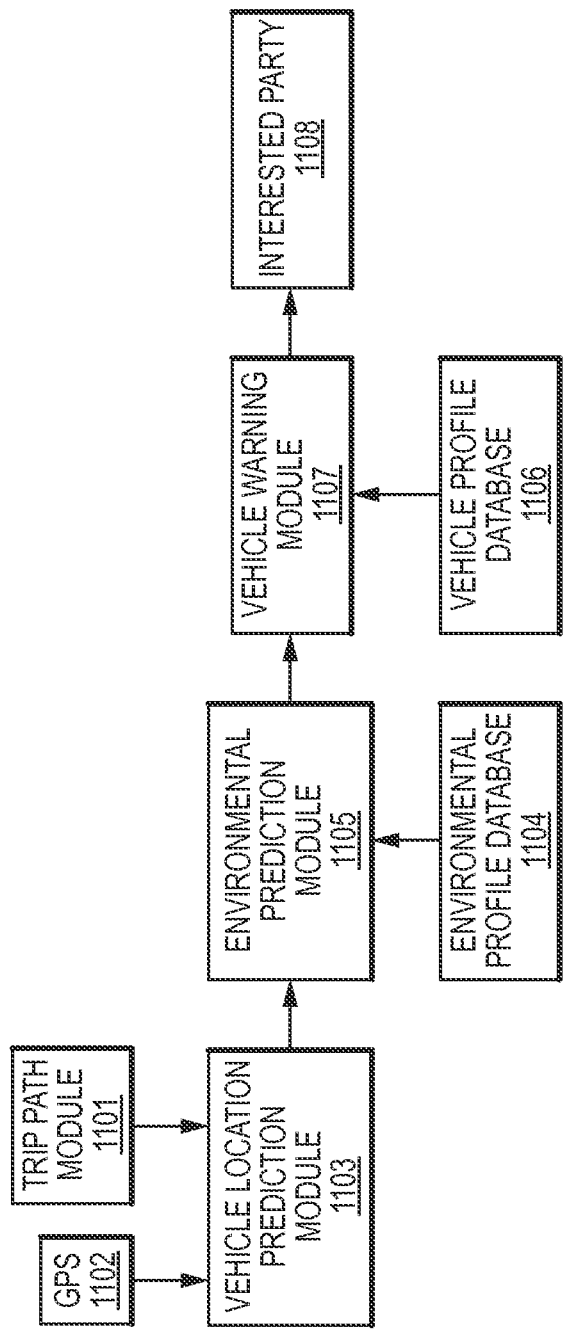
FIG. 11 shows an exemplary system that notifies an interested party in the vehicle if the vehicle is anticipated to encounter a potentially hazardous environment.

Such a warning system is described in FIG. 11. In this embodiment, information on the vehicle location from a GPS 1102 and optionally from a trip path module 1101 is fed into a vehicle location prediction module 1103, which predicts the future locations of the vehicles during the trip. This information is fed into an environmental prediction model 1105 alongside environmental profile information from a database 1104 from the cloud. The environmental profile information includes data from the national weather service, local sensors, and/or data collected by other vehicles using the system described in FIG. 10 above, as well as other mobile vehicle weather collection processes. The environmental prediction information is passed to a vehicle warning module 1107, which compares the environmental prediction with the vehicle COF/slip profile to identify whether the predicted environment will be outside the suggested operating specification for a vehicle with that profile. If a threshold is passed, this information is sent as a warning to an interested party 1108. An interested party includes a driver, or a fleet owner, or an insurance operator, etc.

Information, guidance, and warnings may be provided in many ways, including via smart phone or watch (e.g. alarm bells, vibration, texts, phone calls, via traffic apps, text to speech, satellite communications system such as OnStar, and visual cues), as well as visually or auditorially through the vehicle's OBD display, navigation display or text to speech system, radio/entertainment console, vehicle or aftermarket heads up display, DSRC warning system, and many other means. In one embodiment, the information, guidance, and warnings are delivered via text to speech or heads up display to preserve driver concentration the road, In another embodiment, the warnings are integrated with the vehicles safety system to take action if the driver does not. In another embodiment, the information, guidance and warnings are delivered to a self-driving vehicle, so that the vehicle or driver may take appropriate action. In another embodiment, the guidance takes the form of a safe or advised driving speed, or warning to slow down. In another embodiment, the driver or navigator uses voice commands to request information, guidance, or warnings. In another embodiment, the warnings take the form of an escalating series of warnings with regard to weather, safe driving speed, safe stopping distance, or road conditions.

One novel thing element is that, before the weather moved and the (often sparsely located) sensors stayed still, the presented system uses moving mobile sensors that can send information machine-to-machine (M2M). The combination of mobility and M2M creates a "crowd-sourced" mobile sensor "fabric", and the fabric is constructed such that most information is both generated and consumed where there are the most users and sensors. Individual people may perceive changing clouds and precipitation in one area, but networked and fused sensors see changes in pressure, irradiance, humidity, and precipitation rates over large areas, as well as have access to historical weather and data patterns, and thus the whole system is able to do analysis and prediction different in kind rather than degree.

In one embodiment, a plurality of sensors send to a smartphone acting as a hub, which aggregates, organizes, fuses and/or prepares information; a plurality of smartphones, posts that information to a collection system, where it is quality control checked; a buffering system stores and prioritizes and organizes the data in queues; the data are then fused with existing data such as weather, road, GIS, databases, to create a current situational picture; these situational pictures are made available using (for example) geofencing techniques, both to alert and organize data about motorists and geographic areas; geofencing implies that now we can follow up with a set of triggers, these triggers being assigned to mobile entities, based on fused criteria, indicating desired alerts based on individual preferences.

Additionally, such a machine-to-machine system is able to return information back quickly and per user preferences—the system can have "smart triggers". A simple temperature gauge may alert a user with a red light when the temperature goes below a set value, but a smart trigger seeks information and makes warnings that are context sensitive—such as warning as user about how the confluence of the rate of decrease in pavement temperature and predicted precipitation may generate frozen pavement. Using modern software technologies like Pagerank or Twitter that look for important signals using eigenvectors, these signals can result in information, guidance, or warnings routed to a unique user by indexes to the most important links in the eigenvector in a very fast manner. In such a system, metadata is fused together, an eigenvector analysis is run, then indexed the most important events, making it lightning fast to both find the smart triggers and/or users. This can provide fast M to M alerts—in one embodiment, machines automatically spraying salt on a road that will soon require it, or lower barricades on roads that may soon experience white out conditions, or trigger road signals warning of black ice, all in a very fast and automated manner, scalable to huge numbers of users and triggers.

Use cases for the user criteria of such a system include: soccer mom's criteria is whether she can drive 3 miles safely in the small geofenced area between home and practice; a medium-haul limo service will look at a larger geofenced area, and want fused information about traffic, weather, known pick up sites, and historical patterns in order to make the most efficient run; maintenance and logistics organizations will want to watch vehicles roll over road segments to see what needs repair or where slowdown may be predicted to occur—their user criteria may be real-time analysis, or it may be a forecast about the desirability of salting an iced road in the next four hours, paving a bumpy road in the next four months, or allocating a budget for the next four years; long hall trucking businesses may wish to add weather and road condition forecasts to the fleet management and fleet routing services that are commonly employed by such concerns.

The availability of the various information available to such a system may be used in novel ways. For instance, unique signals can be created which may be analyzed using advanced mathematical and analytical techniques, identifying conditions, and forecasting conditions in ways that were previously unavailable (e.g., machine learning algorithms with novel features for weather knowledge and actionable information, and neural networks provide logistic regression outputs not previously available do to the scarcity of information about road weather conditions).

A method of using this data may for example include receiving tire slip information and/or COF information from vehicle sensors; receiving one or more external environmental conditions information from a database; receiving a route request having at least route information and time of departure information; generating safety values for a plurality of portions of the requested route based on the received environmental conditions information and previously stored vehicle performance information associated with the route request; determining if the generated safety values meet at least one of a predefined safety threshold or a time of travel threshold; if the determination indicates that one of the safety values fails to meet the at least one safety threshold or the time of travel threshold, generating at least one of a new route or a new time of departure that would cause the generated safety values to meet the safety threshold or the time of travel threshold; and presenting the generated new route or new time of departure to a user or interested party associated with the route request. In one embodiment, the database data includes COF/slip information collected from a plurality of sensors located on a plurality of ground vehicles.

As noted, vehicle sensor and/or profile information may be usefully combined into a vehicle library or database in the cloud. This library or database will allow estimation of COF/slip performance in weather and/or road conditions for a specified vehicle, even if that vehicle does not have a profile that extends to the current environmental and/or conditions, by comparing this specified vehicle with other vehicles with similar properties and/or using sensor outputs from other vehicles. Similar properties may include, but are not limited to, similar model/make, similar tires, similar number of miles on the tires, similar profiles in measured weather conditions, COF measurements of vehicles traveling over current trip path of a vehicle, etc.

Figure 12:
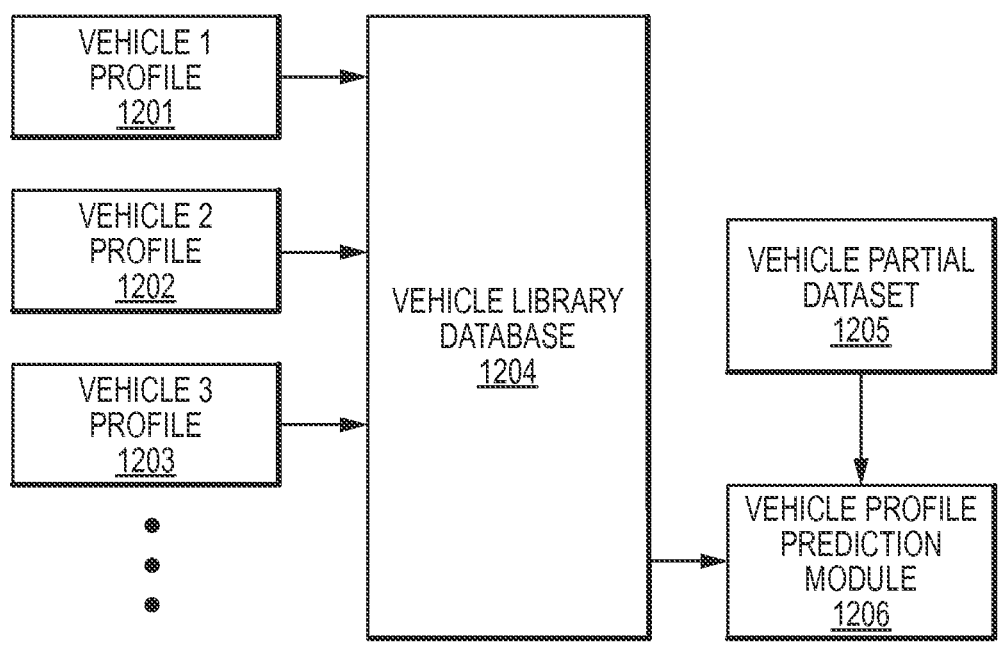
FIG. 12 shows an exemplary system that combines multiple vehicle outputs and/or profiles into a library which can be used to predict vehicle performance in future environments.

Such a process is shown in FIG. 12, where sensor measurements and/or profiles from multiple vehicles 1201, 1202, 1203, etc. are combined into a library 1204. In such an arrangement, a vehicle with an incomplete profile 1205 does not necessarily have measured data that correlates to the specific weather conditions. As a result, its performance can be estimated by the vehicle prediction module 1206 by extrapolating from data for similar vehicles profiles in the library.

Figure 14:
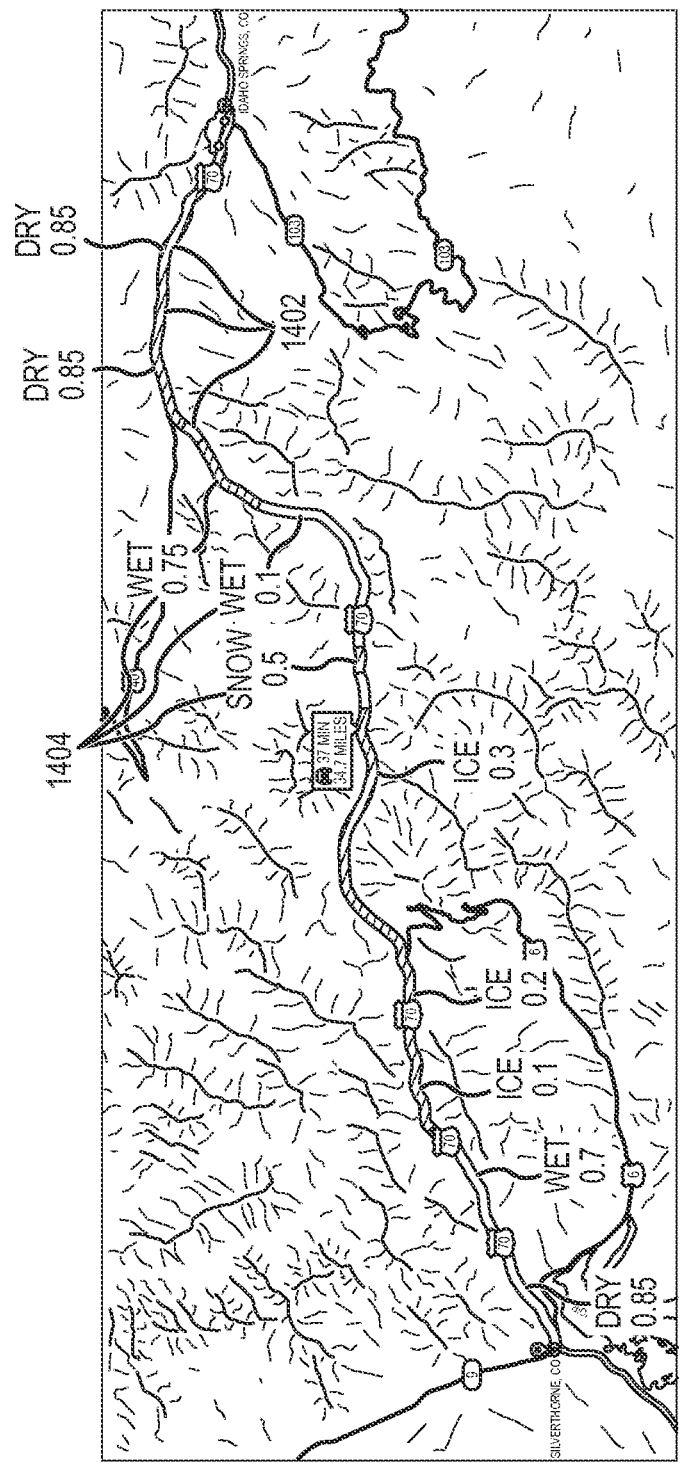
FIG. 14 shows a travel path of a vehicle with road surface information for different road segments of the travel path.

In one embodiment, a vehicle may receive information from the cloud based database (or other wirelessly accessible database) for use with vehicle profile information. For instance, FIG. 14 illustrates an expected travel path of a vehicle traveling between first and second locations (e.g., Idaho Springs, Colo. and Silverthorne, Colo.). Such an expected travel path may be inferred based on a current travel direction of a vehicle, previous user information, or entered by a user. The database may provide information for the expected travel path to the vehicle. In this regard, the database may include measurements and/or profiles of vehicles having previously traveled over the expected travel path. Such information may be for vehicles that have traveled over the expected travel path within a predetermined time period (e.g., previous fifteen minutes, hour, six hours, day etc.) In the present embodiment, the database may provide prior COF information/measurements of vehicles passing over the travel path. In this regard, prior COF information 1402 may be provided for predetermined road segments (e.g., every quarter mile) and/or for changes in road geography, surface and/or road structure (e.g., changes in road grade, changes from asphalt to concrete, changes from new asphalt to worn asphalt, bridge susceptible to icing, etc.). This is illustrated on the map shown in FIG. 14 which shows prior COF information 1402 that is provided for different segments of the travel path.

The prior COF information for the travel path may be determined in any manner from previously reported COF information. For instance, the prior COF information may be an average of all COFs reported by vehicles having previously passed over all or portions of the travel path. Any other mathematical representation (e.g., mode, mean etc.) of the prior COFs may be provided. The prior COF information may be further analyzed based on, for example vehicle type. In this regard, the type of vehicle on the travel path may be known and the vehicle may request or otherwise receive COF information for like vehicles: rear wheel drive vehicles, small all wheel drive, large all wheel drive, trucks, etc. That is, prior COF information for like vehicles may be provided along the travel path.

Upon receiving prior COF information, the vehicle may correlate the prior COF information for upcoming segments with the profiles 1302*a-n* stored in the on-board vehicle profile database 907. Alternatively, the vehicle may access stored profiles from the cloud based database 908. See FIG. 9. The cloud based profiles may be generated by the subject vehicle or may be profiles of other like vehicles. In any arrangement, the vehicle profile computation module 906 may utilize the prior COF information with the profiles 1302*a-n* to determine the expected performance of the vehicle on the upcoming road segment. For instance, an expected wheel slip percentage may be calculated.

As shown in FIG. 13, using the prior COF information as an input with the profiles 1302 allows for determining an expected slip percentage if the environmental conditions of the road segment is known or determinable. Such environmental conditions may be determined using sensors of the vehicle. Alternatively, prior environmental conditions 1404 may be provided to the vehicle with the prior COF information. See FIG. 14. Stated otherwise, the library may, in addition to providing prior COF information, provide prior environmental information 1404 as reported by previous vehicles passing over the expected travel path. More generally, the library may provide road surface information (e.g., COF information and environmental information) to the vehicle. In either case, the vehicle traveling on the travel path may utilize the COF information and/or environmental information with stored profiles (See FIG. 13) to determine performance/safety information for the vehicle prior to the vehicle passing over upcoming segments of the travel path.

Figure 15:
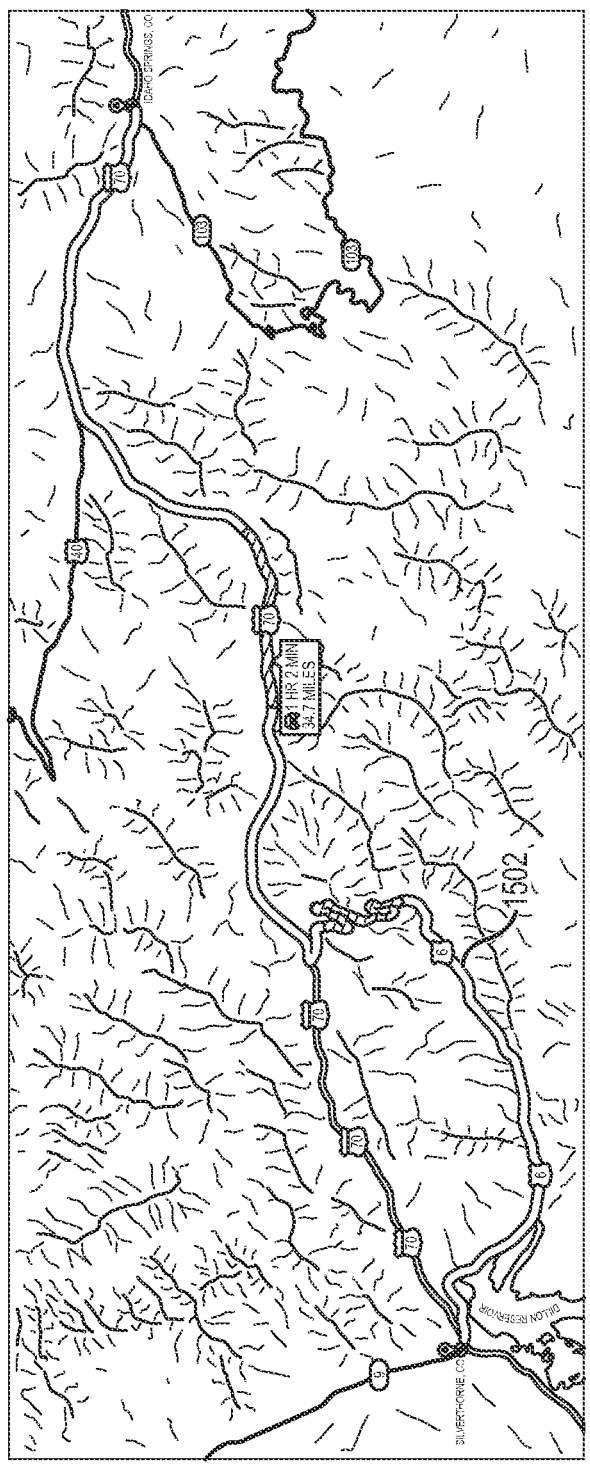
FIG. 15 shows an alternate suggested route for the travel path of FIG. 14.

Based on the estimated wheel slip of the vehicle, various outputs (e.g., predictions) may be provided to the driver of the vehicle and/or to the control systems of the vehicle. For instance, if a slip percentage for an upcoming road segment exceeds a predetermined threshold, a warning output may be generated. In a further arrangement, an alternate route 1502 may be suggested if a slip percentage for an upcoming road segment exceeds a predetermined threshold. See FIG. 15.

Figure 16:
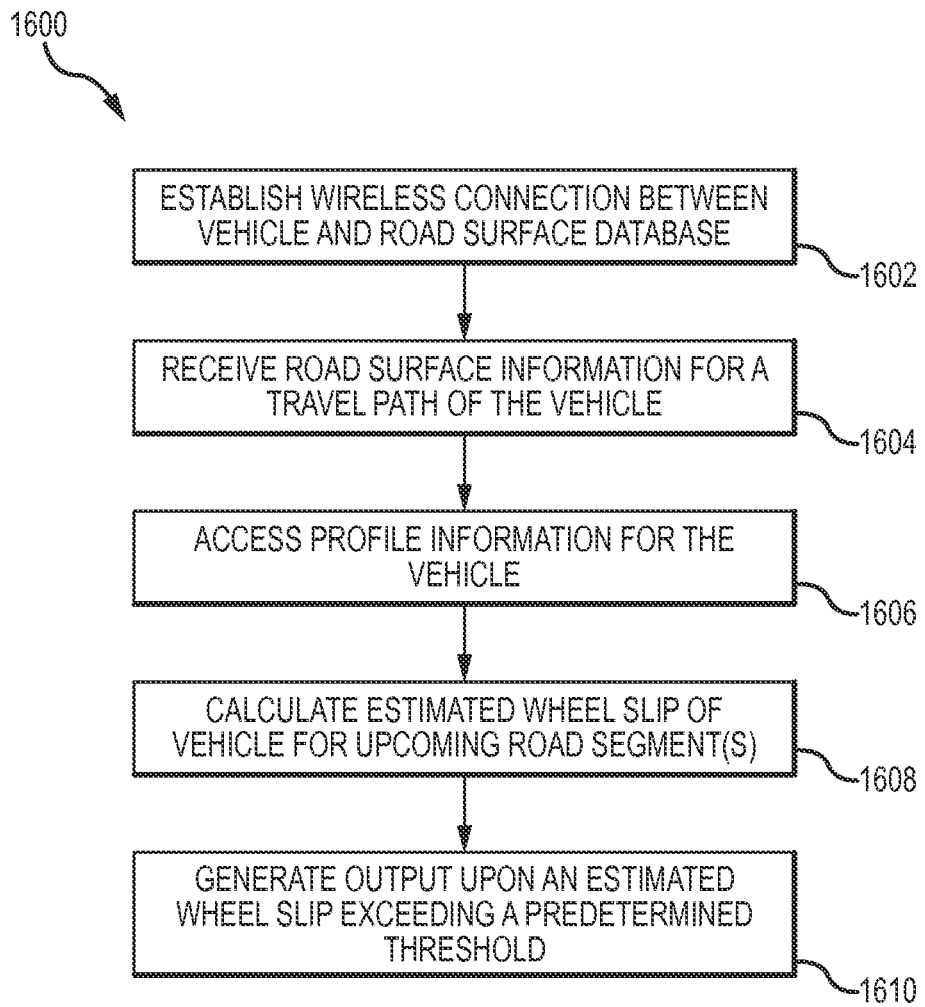
FIG. 16 shows a process for generating safety outputs at a vehicle.

FIG. 16 illustrates a process 1600 for utilizing prior road surface information at a vehicle. The process begins with the establishing 1602 of a wireless connection between a vehicle and a road surface database. Once communications exist between the vehicle and the database, the vehicle may request and/or receive 1604 road surface information from the database for a travel path of the vehicle. In some instances, the database may be operative to push data to the vehicle without a request originating from the vehicle. That is, if conditions warrant providing data, the database may initiate contact and/or automatically provide data to a vehicle. The road surface information typically includes COF information for one or more segments of the travel path. The road surface information may further include environmental information for the one or more segments of the travel path. An on-board processor of the vehicle then accesses 1606 one or more profiles of the vehicle. Such access may be from local storage or via the wireless connection. Using the road surface information and the profile(s), the processor is operative to calculate 1608 estimated wheel slip for one or more upcoming segments of the travel path. If one or more of the wheel slip estimates exceed a predetermined threshold(s), an output may be generated 1610 for receipt by the driver of the vehicle and/or vehicle control systems. Such driver outputs may be related to speed reduction recommendations and alternate route suggestions among others.

Figure 17:
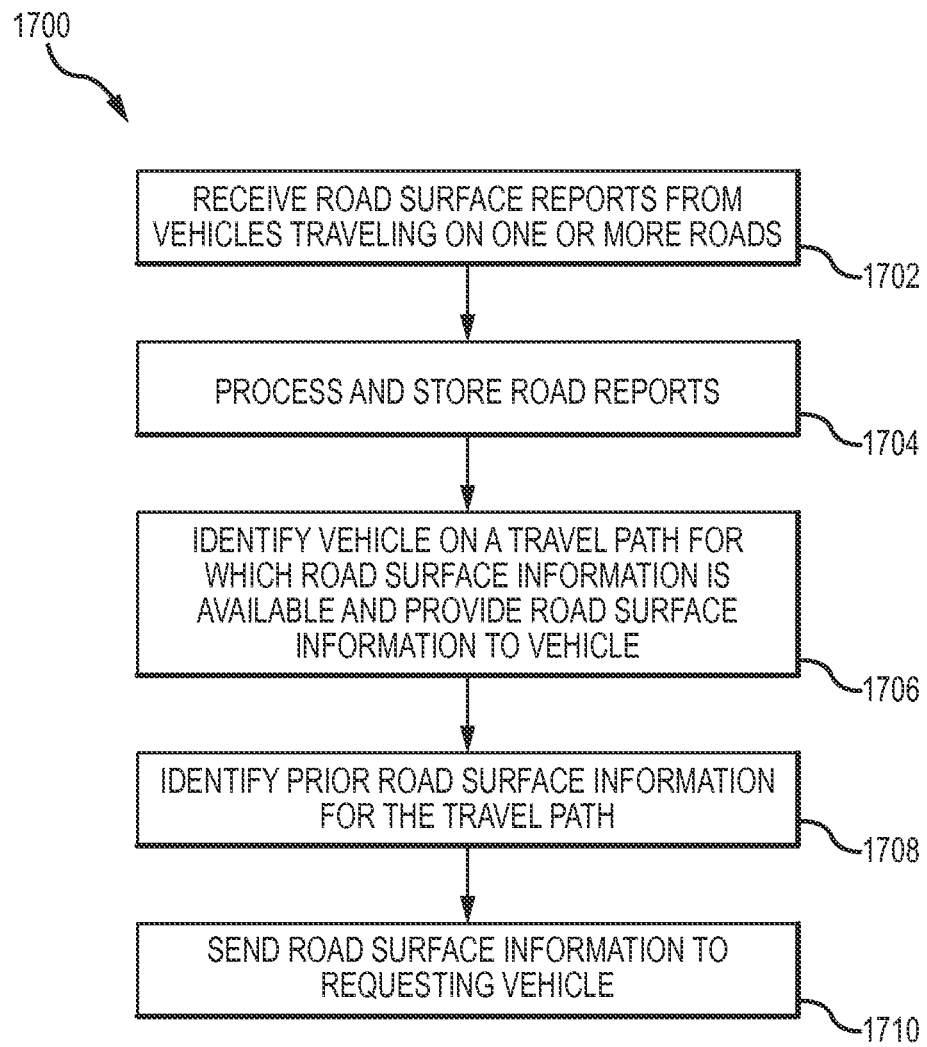
FIG. 17 shows a process for gathering and distributing road surface information.

FIG. 17 illustrates a process 1700 for gathering and distributing road surface information. Initially, a processing platform/database receives 1702 road surface reports from a plurality of vehicles traveling over roads. These road surface reports typically include COF information determined by the vehicles along with location information identifying where the COF information was determined. The road surface reports may also include environmental information measured directly or from which environmental information for the location may be determined (e.g., in conjunction with a weather model). The processing platform processes and stores 1704 information from or derived from the road surface reports. At a subsequent time, a request for road surface information for a travel path is received 1706 from a vehicle or the processing platform determines a vehicle is traveling a travel path for which pertinent road surface information is available. In the latter regard, the processing platform may be receiving road surface reports from a vehicle and if no adverse road conditions are known, not information may be provided. Conversely, if upcoming road conditions are determined adverse (e.g., COF for a road segment drops below a predetermined threshold) information may be pushed to the vehicle absent a request from the vehicle. In any case, stored road surface information is then processed to identify 1708 prior road surface information for the travel path. The identified road surface information is then sent 1710 to the requesting vehicle.

The modules 904, 906, 1004, 1005, 1101, 1103, 1105, 1107, and 1206 and/or processes described in relation to FIGS. 9-12 and 16-17 are processing functions that may be performed by processors located at one or more of the locations such as the lug nut, bumper or windshield systems, or at a processor located on-board or off-board the vehicle.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art can be made within the scope of the present invention. The embodiments described hereinabove are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

The invention claimed is:

1. A method for use in predicting vehicle performance over a road segment, comprising:
    establishing a wireless connection between a vehicle moving along a travel path and a database having road surface information for said travel path of the vehicle, wherein said road surface information is compiled from vehicles previously passing over at least a portion of said travel path;
    accessing said road surface information from the database for one or more upcoming road segments along said travel path;
    accessing stored profile information for the vehicle, wherein said profile information includes at least one vehicle performance characteristic indexed to road surface conditions;
    calculating a vehicle performance value for the vehicle for at least one of said upcoming road segments along said travel path using said stored profile information and said road surface information; and
    upon said vehicle performance value exceeding a predetermined threshold, generating an output for receipt by an occupant of the vehicle.

2. The method of claim 1, wherein establishing the wireless connection further comprises:
    identifying a current location of the vehicle and at least one substantially current environmental condition for the current location of the vehicle, wherein the vehicle performance value is further calculated based at least in part on the current environmental condition.

3. The method of claim 2, wherein the substantially current environmental condition is determined by an on-board sensor of the vehicle.

4. The method of claim 2, wherein the substantially current environmental condition is determined by one or more roadway sensors affixed to infrastructure of the travel path.

5. The method of claim 1, wherein accessing stored profile information for the vehicle further comprises:
    identifying a vehicle type and accessing profile information corresponding to the vehicle type.

6. The method of claim 1, wherein accessing stored profile information for the vehicle further comprises:
    identifying the vehicle and accessing a vehicle profile specific to the vehicle.

7. The method of claim 6, wherein the vehicle profile is generated by the vehicle.

8. The method of claim 6, wherein accessing stored profile information for the vehicle comprises accessing a memory unit co-located with the vehicle.

9. The method of claim 1, further comprising:
    accessing weather information for the travel path of the vehicle, where the vehicle performance value is further calculated based at least in part on the weather information.

10. The method of claim 1, wherein the weather information is acquired from received from vehicles previously passing over at least a portion of the travel path.

11. The method of claim 9, wherein the weather information is acquired from a weather forecast model.

12. The method of claim 1, wherein the road surface information comprises coefficient of friction information associated with tire to road interface information determined by prior vehicles traveling over at least a portion of the travel path.

13. The method of claim 1, wherein calculating the vehicle performance value comprises calculating an estimated wheel slip of the vehicle for the at least one upcoming road segment.

14. The method of claim 1, wherein the stored profile information comprises wheel slip information indexed to road coefficient of friction information for at least two environmental conditions.

15. The method of claim 1, wherein the road surface information comprises at least one of:
    road surface temperature;
    road surface precipitation;
    road surface grade;
    road surface type; and
    road surface coefficient of friction.

16. The method of claim 1, wherein the output comprises an alternate route suggestion.

* * * * *